United States Patent
Honma

[11] Patent Number: 6,061,212
[45] Date of Patent: May 9, 2000

[54] MAGNETIC HEAD WITH CIRCULAR NOTCHES AND MAGNETIC RECORDING/ REPRODUCING APPARATUS USING THE SAME

[75] Inventor: Yoshiyasu Honma, Katano, Japan

[73] Assignee: Matsushita Electric Industrial Co., Ltd., Osaka, Japan

[21] Appl. No.: 08/647,675

[22] Filed: May 15, 1996

[30] Foreign Application Priority Data

May 18, 1995 [JP] Japan ..................................... 7-119690

[51] Int. Cl.[7] ........................... G11B 5/127; G11B 5/187; G11B 5/23; G11B 5/40
[52] U.S. Cl. ........................... 360/126; 360/122; 360/119
[58] Field of Search ..................... 360/126, 125, 360/122, 119, 123, 120

[56] References Cited

U.S. PATENT DOCUMENTS

| | | | |
|---|---|---|---|
| 3,668,775 | 6/1972 | Morita et al. | 29/603.12 |
| 4,110,902 | 9/1978 | Tamura et al. | 29/603.16 |
| 4,425,701 | 1/1984 | Takahashi et al. | 29/603.09 |
| 4,711,018 | 12/1987 | Matsuzawa | 360/125 |
| 4,803,338 | 2/1989 | Kumasaka et al. | 360/120 |
| 4,890,378 | 1/1990 | Suzuki et al. | 360/119 |
| 4,926,276 | 5/1990 | Orikasa et al. | 360/125 |
| 4,953,048 | 8/1990 | Kameyama et al. | 360/122 |
| 5,022,140 | 6/1991 | Tsutaki et al. | 29/603.13 |
| 5,113,299 | 5/1992 | Onoe | 360/126 |
| 5,182,690 | 1/1993 | Katori et al. | 360/120 |
| 5,222,006 | 6/1993 | Yanagi | 360/126 |
| 5,289,329 | 2/1994 | Hirano et al. | 360/121 |
| 5,298,113 | 3/1994 | Matsuzawa et al. | 29/603.07 |
| 5,515,222 | 5/1996 | Kumagai et al. | 360/125 |
| 5,519,555 | 5/1996 | Naitoh et al. | 360/125 |

FOREIGN PATENT DOCUMENTS

| | | |
|---|---|---|
| 0499473 | 8/1992 | European Pat. Off. . |
| 0558235 | 9/1993 | European Pat. Off. . |
| 0646907 | 4/1995 | European Pat. Off. . |
| 59-223924 | 12/1984 | Japan . |
| 61-260408 | 11/1986 | Japan . |
| 4-353607 | 12/1992 | Japan . |
| 6-295412 | 10/1994 | Japan . |
| 6-314411 | 11/1994 | Japan . |
| 7-220218 | 8/1995 | Japan . |

OTHER PUBLICATIONS

Search Report for European Appl. 96107761.7, Mailed Aug. 22, 1996.

Primary Examiner—Craig A. Renner
Attorney, Agent, or Firm—Renner, Otto, Boisselle & Sklar

[57] ABSTRACT

A magnetic head includes a pair of magnetic cores each having a convexly processed part, the convexly processed parts being disposed opposite to each other with a magnetic gap member inserted therebetween, and a pair of glass blocks disposed on both sides of the pair of magnetic cores, thereby coupling together the pair of magnetic cores. In the magnetic head, a metal magnetic film is formed on a projection end face of the convexly processed part in each of the pair of magnetic cores. A pair of notches regulating a track width are formed on a magnetic tape sliding face of the pair of magnetic cores by electric discharge machining so as to flank a butted part of the convexly processed parts of the pair of magnetic cores from both sides. Each of the notches has a shape such that an interface thereof is not positioned out of an edge of a recording pattern on a magnetic tape when the magnetic tape travels.

19 Claims, 14 Drawing Sheets

MAGNETIC HEAD WITH CIRCULAR NOTCHES AND MAGNETIC RECORDING/ REPRODUCING APPARATUS USING THE SAME

BACKGROUND OF THE INVENTION

1. Field of the Invention

The present invention relates to a magnetic head which performs recording or reproduction of information signals on a magnetic recording medium, a method for producing the same, and a magnetic recording/reproduction apparatus using the same. It relates particularly to a narrow-track magnetic head for high density magnetic recording used in a digital VCR or the like, a method for producing the same, and a magnetic recording/reproduction apparatus using the same.

2. Description of the Related Art

In order to record/reproduce a large amount of information signals such as found in digital VCR, it is necessary to employ high density magnetic recording/reproduction techniques such as the narrow-track technique and the short-wavelength technique. Generally, it is known that for the realization of high density magnetic recording/reproduction, it is better to increase the coercive force of a recording medium or to increase the saturation magnetic flux density (hereinafter, referred to as a "Bs") of a magnetic head.

However, a ferrite material, which has mainly been used in the prior art as a material for a magnetic head, has a Bs of about 0.5 T, which is not sufficiently large. Therefore, when a prior art magnetic head made of the ferrite material is used on a metal tape having a high coercive force of 80 kA/m or more, there occurs magnetic saturation so that a recording and reproduction of information might not be conducted with certainty.

To resolve the situation, magnetic heads have currently been suggested which are made of a new material having a Bs larger than that of the ferrite material, such as a Sendust alloy film (Bs: about 1.0 T) or a Co type amorphous film (Bs: about 0.8 T to about 1.1 T), or other materials having a Bs of about 1.3 T or more, such as a Co type superstructure nitriding alloy film, an Fe type superstructure nitride film or an Fe type nitride film. Among these, research has been vigorously conducted particularly on a composite magnetic head, or so-called MIG head, in which the main core is made of ferrite and a magnetic thin film is disposed on the surface of the main core at least in the vicinity of the front gap.

FIG. 13 is a perspective view illustrating an example of a configuration of a prior art MIG head.

In the prior art MIG head 500 shown in FIG. 13, a pair of convex or bevelled magnetic cores 502 and 503 are disposed opposite to each other with a magnetic gap 501 being therebetween. The magnetic core 502 includes a convex or bevelled core body 504 (hereinafter, simply referred to as the "core body 504") made of ferrite and a magnetic film 506 which is formed on the surface of the core body 504 and has a high saturation magnetic flux density. Similarly, the magnetic core 503 includes a convex or bevelled core body 505 (hereinafter, simply referred to as the "core body 505") made of ferrite and a magnetic film 507 which is formed on the surface of the core body 505 and has a high saturation magnetic flux density. The magnetic films 506 and 507 are formed so as to cover the projection end faces of the core bodies 504 and 505, respectively, facing the magnetic gap 501, and also completely cover both of the side faces therefrom. The magnetic gap 501 is provided with a non-magnetic film (referred to as "gap member") not shown in FIG. 13. The magnetic cores 502 and 503 are butted to each other with the magnetic gap 501 including the gap member inserted therebetween. Furthermore, the magnetic cores 502 and 503 butted as such are coupled to each other with a pair of glass blocks 508 and 509 which are disposed at both sides of their butting ends. A winding window 510 for coils to pass is provided at the middle of the side faces of the MIG head 500.

In view of the narrow-track technique, the MIG head 500 described above may not be formed with sufficient accuracy with respect to a track width due to a production error such as butting accuracy of the two magnetic cores 502 and 503, or due to the influence of a roundness at the track edge of the magnetic films 506 and 507. Moreover, since the track width cannot be determined unambiguously, sufficient accuracy may not be obtained during the adjustment steps for the track height during assembly. Consequently, a decrease in the yield may result in the production of the MIG head 500.

In order to solve these problems, the applicant of the present application has suggested an MIG head as disclosed in Japanese Laid-Open Patent Publication No. 7-220218, which corresponds to pending U.S. patent application Ser. No. 08/313,594 filed on Sep. 29, 1994. In FIG. 14, a configuration of the top face of the MIG head 600, i.e., the sliding surface for a magnetic tape, is schematically illustrated.

A fundamental configuration of the MIG head 600 is similar to that of the MIG head 500 described before. A pair of convex or bevelled magnetic cores 602 and 603 are disposed opposite to each other with a magnetic gap 601 being therebetween. The magnetic core 602 includes a convex or bevelled core body 604 (hereinafter, simply referred to as the "core body 604") made of ferrite and a magnetic film 606 which is formed on the surface of the core body 604 and has a high saturation magnetic flux density. Similarly, the magnetic core 603 includes a convex or bevelled core body 605 (hereinafter, simply referred to as the "core body 605") made of ferrite and a magnetic film 607 which is formed on the surface of the core body 605 and has a high saturation magnetic flux density. The magnetic films 606 and 607 are formed so as to cover the projection end faces of the core bodies 604 and 605, respectively, facing the magnetic gap 601, and also completely cover both of the side faces therefrom. The magnetic gap 601 is provided with a nonmagnetic film as a gap member. The magnetic cores 602 and 603 are butted to each other with the magnetic gap 601 including the gap member inserted therebetween. Furthermore, the magnetic cores 602 and 603 butted as such are coupled to each other with a pair of glass blocks 608 and 609 which are disposed at both sides of their butting ends.

The magnetic tape sliding face of the MIG head 600 is provided with notches 613a and 614a over both of the magnetic cores 602 and 603 in addition to a convexly processed part 639 which regulates the track width. By having these notches 613a and 614a, a track misalignment associated with the butting accuracy of the magnetic cores 602 and 603 within the magnetic head 600 is eliminated, and degradation of accuracy due to a roundness of the track edge, or so-called fringe, is also reduced considerably.

However, since a number of processes are also conducted after processing steps for the notches 613a and 614a in the production of the MIG head 600, there may result a track misalignment between the magnetic cores 602 and 603 on a microscopic level, and it may be the case that an initial track width cannot be maintained with sufficient accuracy.

Furthermore, the side faces of the convexly processed or bevelled part 639 of the magnetic cores 602 and 603 are provided with an antireaction film 640 made of a material such as $SiO_2$, $ZrO_2$, $Ta_2O_5$, glass, Cr, or a composite thereof, at the interfaces between the glass blocks 608 and 609 and the magnetic films 606 and 607. Thus, a chemical reaction between the magnetic cores 602 and 603 (more precisely the magnetic films 606 and 607) and the glass blocks 608 and 609, respectively, is inhibited. However, the interfaces between the magnetic films 606 and 607 and the glass blocks 608 and 609 at the notches 613a and 614a are not provided with such antireaction films 640. Consequently, the chemical reaction may occur therebetween and, as a result, problems such as a blur at the track edge may occur.

Due to problems described above, even with the MIG head 600 illustrated in FIG. 14, problems associated with the accuracy of the track width still remain.

On the other hand, improvement of the accuracy of the track width has been tried in several prior art techniques so far.

For example, U.S. Pat. No. 4,110,902 discloses a method for regulating a track width by a wire from the top face of the sliding face. This is to process the entire sliding face for a fixed track width. However, a problem concerning wear resistivity due to contact with a running magnetic medium may result, and there is a possibility of significant deterioration of magnetic characteristics.

U.S. Pat. No. 3,668,775 discloses a magnetic head which is configured such that a dimension of the entire core matches the track width. However, even with this configuration, there is still a possibility of significant deterioration of magnetic characteristics. Moreover, strength of the magnetic head may deteriorate.

Furthermore, U.S. Pat. No. 5,298,113 discloses a production method for a magnetic head in which the vicinity of a track is processed with a turning tool. In this method, however, there is a possibility that an edge of the magnetic gap, which is a primary part of the magnetic head for conducting magnetic recording/reproduction, is damaged. An occurrence of such damage leads to a deterioration of magnetic characteristics and is not preferable in view of operational characteristics of the magnetic head. Moreover, in view of machining accuracy, it is difficult to process with an accuracy of about 1 μm or less. Particularly, there is a difficulty in keeping constant machining accuracy in the depth direction of the magnetic gap.

Furthermore, in the disclosed machining method using the turning tool, the turning tool must be pressed against the magnetic core to process it into a predetermined shape during actual implementation of the method. As a result, materials in a bar shape cannot be processed, posing a problem associated with the realization of mass production. In addition, a deterioration of magnetic characteristics may occur due to a process-induced denatured layer on the processed surface, posing a problem that a predetermined effective track width cannot be maintained with accuracy.

As a result of the recent improvement of a recording density in magnetic recording, it is becoming a requirement that, for a magnetic head, a track width of about 10 μm or less be obtained with an accuracy of about ±0.5 pm or less. However, as has been described above, it is almost impossible with the prior art technique to meet the requirements described above without a deterioration of magnetic characteristics.

SUMMARY OF THE INVENTION

The magnetic head according to the present invention includes: a pair of magnetic cores each having a convexly processed part, said convexly processed parts being disposed opposite to each other with a magnetic gap member inserted therebetween; and a pair of glass blocks disposed on both sides of said pair of magnetic cores, thereby coupling together said pair of magnetic cores.

A magnetic film is formed at least on a projection end face of said convexly processed part in each of said pair of magnetic cores; and a pair of notches regulating a track width are formed on a magnetic tape sliding face of said pair of magnetic cores by electric discharge machining so as to flank a butted part of said convexly processed parts of said pair of magnetic cores from both sides, said pair of notches having a shape such that an interface thereof is not positioned out of an edge of a recording pattern on a magnetic tape when said magnetic tape travels.

Preferably, said pair of notches are circular in shape. More preferably, a tangent to an arc of said notch at an intersection point of a magnetic gap and said arc is substantially parallel with a direction of travel of said magnetic tape. Alternatively or further preferably, a radius of the arc of said notch is smaller than a minimum thickness of said magnetic film provided on said projection end face.

In one embodiment, an interface between said magnetic film and said magnetic core is substantially parallel with a face of said magnetic gap at said projection end face.

Preferably, an antireaction film is further provided at least between said pair of notches and said pair of glass blocks.

Preferably, each of said pair of glass blocks includes a front glass block positioned close to said magnetic tape sliding face of the magnetic head and a back glass block positioned away from said magnetic head sliding face. A softening point of said front glass block is set lower than a softening point of said back glass block.

According to another aspect of the invention, a magnetic head includes: a pair of magnetic cores each having a convexly processed part, said convexly processed parts being disposed opposite to each other with a magnetic member inserted therebetween; and a pair of glass blocks disposed on both sides of said magnetic cores, thereby coupling together said pair of magnetic cores. A magnetic film is formed at least on a projection end face of said convexly processed part of at least one of said pair of magnetic cores. A pair of notches regulating a track width are formed on a magnetic tape sliding face of said pair of magnetic cores so as to flank a butted part of said convexly processed parts of said pair of magnetic cores from both sides. And an antireaction film is provided at least between said pair of notches and said pair of glass blocks.

According to still another aspect of the invention, a magnetic head includes: a pair of magnetic cores each having a convexly processed part, said convexly processed parts being disposed opposite to each other with a magnetic member inserted therebetween; and a pair of glass blocks disposed on both sides of said magnetic cores, thereby coupling together said magnetic cores. A magnetic film is formed at least on a projection end face of said convexly processed part of at least one of said pair of magnetic cores. A pair of notches regulating a track width are formed on a magnetic tape sliding face of said pair of magnetic cores so as to flank a butted part of said convexly processed parts of said pair of magnetic cores from both sides. And each of said pair of glass blocks includes a front glass block positioned close to said magnetic tape sliding face of the magnetic head and a back glass block positioned away from said magnetic head sliding face, a softening point of said front glass block being set lower than a softening point of said back glass block.

In the magnetic head having the aforementioned configurations, said notch is preferably formed by electric discharge machining.

Preferably, each of said pair of magnetic cores includes a ferrite core, said magnetic film being provided on a surface of each of said ferrite core, and said pair of notches being formed only in said magnetic film.

In one embodiment, the magnetic head further includes a winding window for winding a coil, said pair of notches reaching said winding window.

According to the present invention, a magnetic recording/reproduction apparatus which includes a magnetic head having the aforementioned configurations is provided.

According to still another aspect of the invention, a method for producing a magnetic head is provided, wherein said head includes: a pair of magnetic cores each including a convexly processed part and a magnetic film provided at least on a projection end face of said convexly processed part; and a glass block including a front glass block positioned close to a front face of said magnetic core and a back glass block positioned away from said front face of said magnetic core. The method includes: the first step of disposing said projection end faces butted to and opposite to each other with a magnetic gap member inserted therebetween; the second step of providing, by electric discharge machining, a pair of notches regulating a track width on a magnetic tape sliding face of said pair of magnetic cores so as to flank a butted portion of said convexly processed part of said pair of magnetic cores from both sides; the third step of forming an antireaction film preventing chemical reaction between said metal magnetic film and said glass block at least on a surface of said pair of notches; and the fourth step of filling with a glass material a groove provided beforehand at a predetermined position of said pair of magnetic cores by heat treatment so as to form said front glass block.

Preferably, the method further includes the step of welding together said pair of magnetic cores with said back glass block prior to the formation of said notch.

According to still another aspect of the invention, a method for producing a magnetic head is provided, wherein said head includes: a pair of magnetic cores each including a convexly processed part and a metal magnetic film provided at least on a projection end face of said convexly processed part; and a glass block including a front glass block positioned close to a front face of said magnetic core and a back glass block positioned away from said front face of said magnetic core. The method includes: the first step of disposing said projection end faces butted to and opposite to each other with a magnetic gap member inserted therebetween; the second step of welding together said pair of magnetic cores with said back glass block; the third step of providing, by electric discharge machining, a pair of notches regulating a track width on a magnetic tape sliding face of said pair of magnetic cores so as to flank a butted portion of said convexly processed part of said pair of magnetic cores from both sides; and the fourth step of filling with a glass material a groove provided beforehand at a predetermined position of said pair of magnetic cores by heat treatment so as to form said front glass block.

Preferably, a softening point of said front glass block is set lower than a softening point of said back glass block, and a heat treatment temperature in the step of forming said front glass block by thermal filling is set lower than the softening temperature of said back glass block.

Preferably, in the step of forming said notch by electric discharge machining, an end portion of said magnetic core is machined by an electric discharge machining electrode of a cylindrical shape while rotating the electrode.

In one embodiment, in the step of forming said notch by electric discharge machining, an end portion of said magnetic core is machined with a tip of an electric discharge machining electrode reaching at least a winding window.

According to the present invention, a magnetic recording/reproduction apparatus which includes a magnetic head formed by a production method described above is provided.

Thus, the invention described herein makes possible the advantages of (1) providing a high performance narrow-track magnetic head which can be used for high density technique for magnetic recording, (2) providing a method for producing the above-mentioned narrow-track magnetic head with a high yield and at low cost, and (3) providing a magnetic recording/reproduction apparatus suited for a narrow-track pitch by utilizing the above-mentioned magnetic head and the production method thereof.

These and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to figures.

Figure 1:
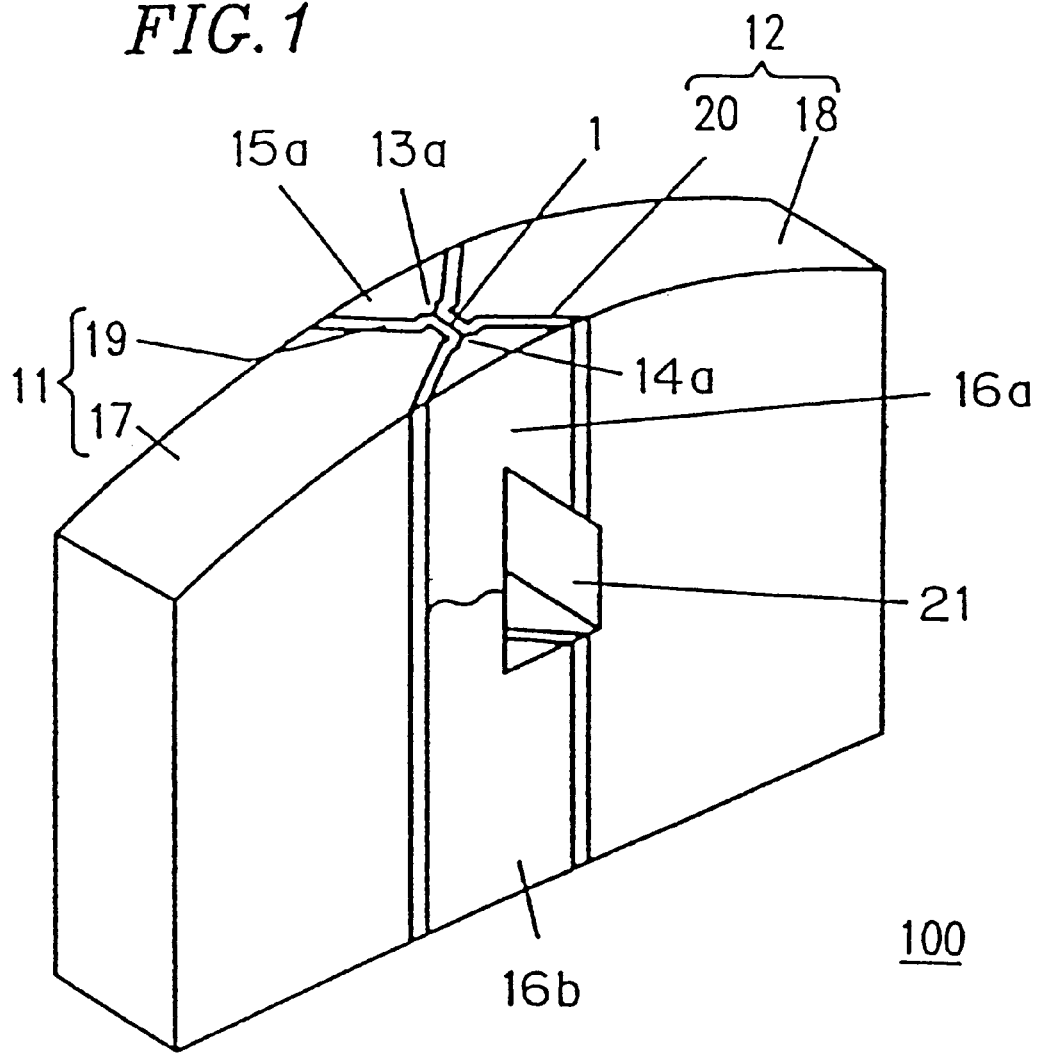
FIG. 1 is a perspective view schematically illustrating a configuration of a magnetic head in an embodiment of the present invention.
Figure 2:
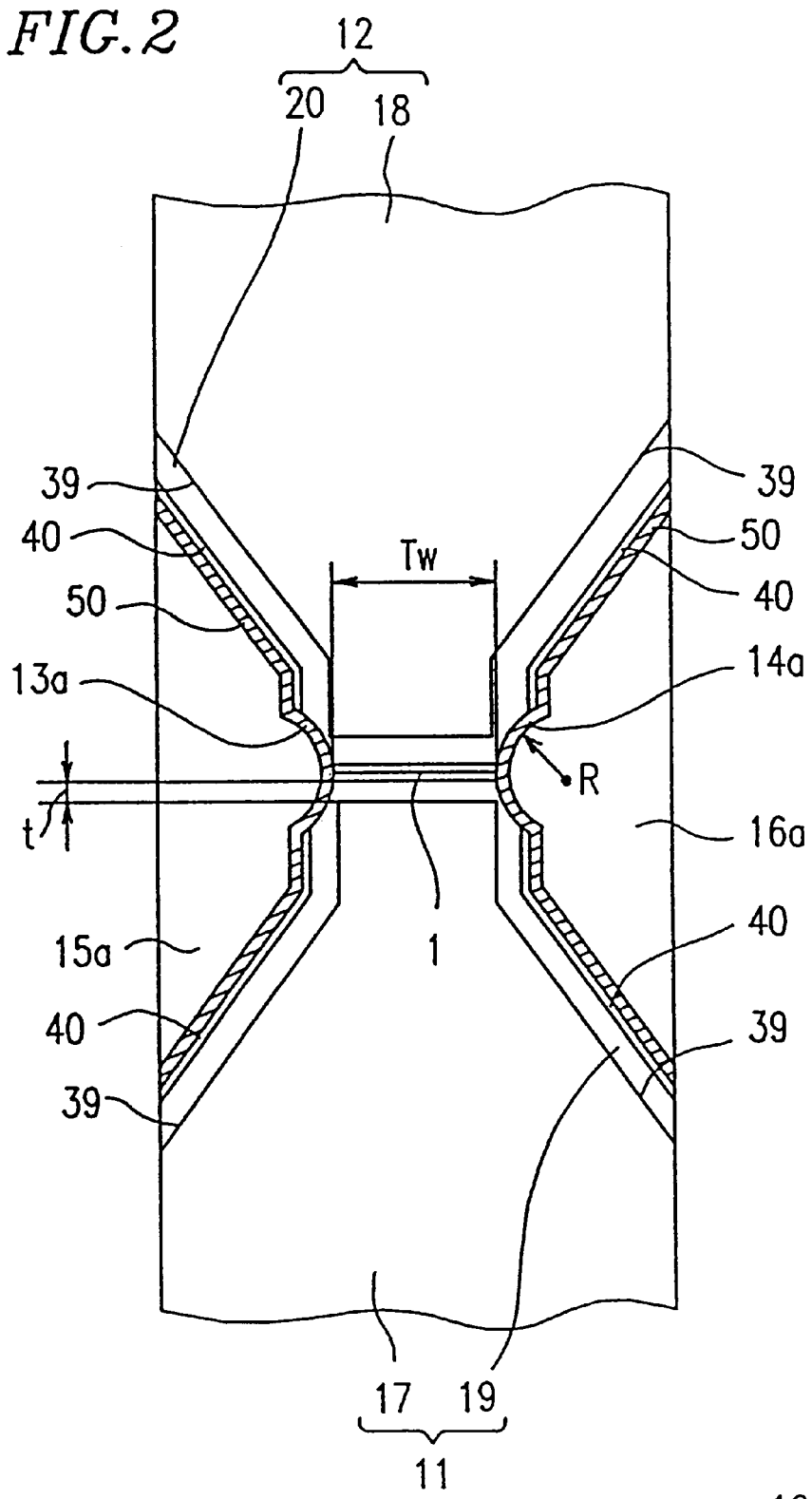
FIG. 2 is a plan view schematically illustrating a configuration of a magnetic tape sliding face of the magnetic head in the embodiment of the present invention.

FIG. 1 is a perspective view schematically illustrating a configuration of a magnetic head 100 in one embodiment of the present invention, and FIG. 2 is a plan view schematically illustrating a configuration of the top face of the magnetic head 100, i.e., the magnetic tape sliding face.

In the magnetic head 100, a pair of convex or bevelled magnetic cores 11 and 12 which are disposed opposite to each other with a magnetic gap 1 being therebetween are welded and connected together with a pair of glass blocks. The magnetic gap 1 is provided with a gap member 40 (not shown in FIG. 1, see FIG. 2). One of the pair of the glass blocks includes a front glass block 15a positioned close to the magnetic tape sliding face of the magnetic cores 11 and 12, and a back glass block 15b positioned away from the magnetic tape sliding face. Similarly, the other of the pair of the glass blocks includes a front glass block 16a positioned close to the magnetic tape sliding face of the magnetic cores 11 and 12 and a back glass block 16b positioned away from the magnetic tape sliding face.

The convex magnetic core 11 includes a ferrite core 17 which occupies the majority of the magnetic core, and a magnetic film 19 which has a high saturation magnetic flux density and is formed so as to cover both the projection end face of the convexly processed portion 39 of the ferrite core 17 and the side faces continuing from the projection end face. Similarly, the convex magnetic core 12 includes a ferrite core 18 which occupies the majority of the magnetic core, and a magnetic film 20 which has a high saturation magnetic flux density and is formed so as to cover both the projection end face of the convexly processed portion 39 of the ferrite core 18 and the side faces continuing from the projection end face.

Both of the magnetic cores 11 and 12 further include notches 13a and 14a which are provided so as to sandwich the magnetic gap 1 from both sides. Each of the notches 13a and 14a are formed with a shape of an arc only in the magnetic film 19 or 20 in the vicinity of the track edge. The notches 13a and 14a are provided over both of the magnetic cores 11 and 12 so as to flank the butting portion of the convexly processed portions 39 from both sides. These notches 13a and 14a extend to a winding window 21 provided in the middle of the side faces of the magnetic head 100 while keeping a track width Tw at the top face of the magnetic head 100, i.e., the magnetic tape sliding face. The notches 13a and 14a can be provided so as to reach the ferrite cores 17 and 18.

As will be described in more detail later with reference to production steps, by providing these notches 13a and 14a, and by fixing the convex magnetic cores 11 and 12 with back glass blocks 15b and 16b during the formation of the notches 13a and 14a, a butting misalignment at the track edge is prevented from occurring in the magnetic head 100 even on a micron level.

Furthermore, by selecting constituting materials for the glass blocks such that a softening point of the material for the front glass blocks 15a and 16a is lower than that of the material for the back glass blocks 15b and 16b, the butting misalignment of the magnetic cores 11 and 12 can be further reduced. This is because it becomes possible to set a heat treatment temperature during molding of the front glass blocks 15a and 16a at a temperature lower than the softening point of the back glass blocks 15b and 16b, and consequently the back glass blocks 15b and 16b are not softened during the molding of the front glass blocks 15a and 16a.

Furthermore, in the magnetic head 100, antireaction films 50 (not shown in FIG. 1, see FIG. 2) are provided at the interfaces between the magnetic films 19 and 20 and the glass blocks at the notches 13a and 14a. This prevents the magnetic films 19 and 20 and the glass blocks from making direct contact at the notches 13a and 14a, thereby preventing a chemical reaction from taking place therebetween. As a result, expansion of a track edge does not occur, and the track edge becomes magnetically sharp.

Therefore, the magnetic head 100 according to the present invention makes it possible to regulate the track width Tw to the initial value with high accuracy.

Figure 3:
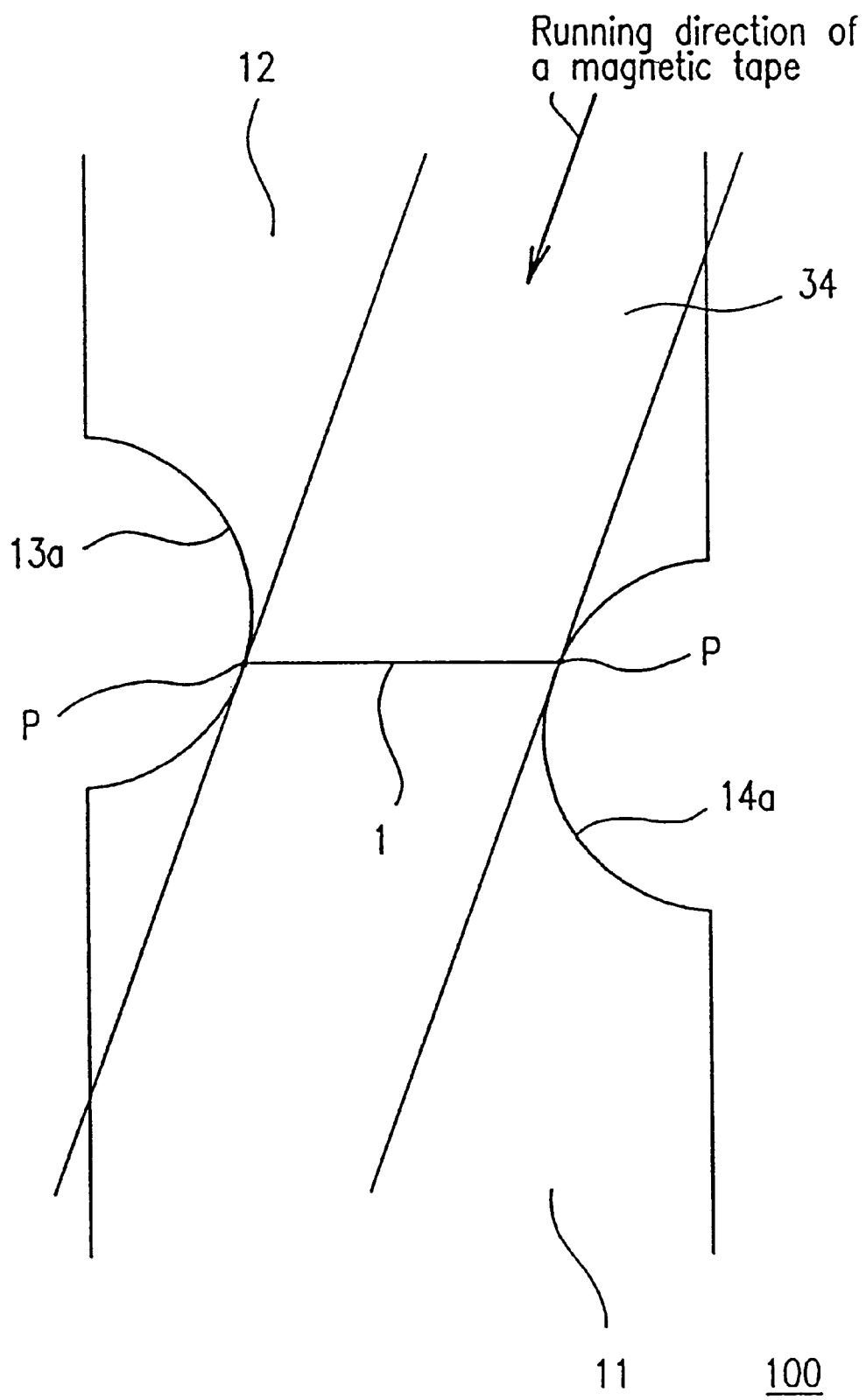
FIG. 3 is a magnified view schematically illustrating a configuration of a gap portion of the magnetic head in the embodiment of the present invention, where the direction of the travel of a magnetic tape is also indicated.

FIG. 3 is a magnified view schematically illustrating the vicinity of the magnetic gap 1 on the top face of the magnetic head 100, i.e., the magnetic tape sliding face thereof, where the running direction of a magnetic tape 34 is indicated by an arrow. As illustrated in the figure, the magnetic tape 34 travels not in the direction of a normal to the magnetic gap 1 of the magnetic head 100 but with a certain angle tilted in order to conduct an azimuth recording. For simplicity, the magnetic film, the antireaction film, and the gap material are not illustrated in FIG. 3.

In the magnetic head 100, the arcs of the notches 13a and 14a are formed such that tangents to the arcs at the points P where the magnetic gap 1 intersects with the notches 13a and 14a are substantially parallel with the direction of the travel of the magnetic tape 34. Due to this configuration, peripheral portions of recording patterns formed on the magnetic tape 34 do not make contact with and travel on the interfaces between the notches 13a and 14a and the front glass blocks 15a and 16a. As a result, a fringe at these interfaces do not occur, thereby making the magnetic head 100 suitable for magnetic recording with a narrow-track pitch. It is also possible to apply the magnetic head 100 according to the present invention to a case where the azimuth angle takes any value. It is further possible to apply the present invention to a magnetic head with zero azimuth angle.

When producing the magnetic head 100 of the present invention, by forming the notches 13a and 14a by electric discharge machining, an occurrence of a process-induced denatured layer at a processed surface can be reduced, as well as a surface roughness of the processed surface can be reduced. Consequently, a narrow-track magnetic head suited for high density magnetic recording is provided without experiencing problems such as a damage of an edge at the magnetic gap, a deterioration of magnetic characteristics, degradation of effective track width accuracy, etc. Furthermore, the above-mentioned electric discharge machining does not inflict physical stress to the constituting members of the magnetic head 100, such as the magnetic cores 11 and 12, during the machining, thereby preventing a crack or the like from occurring. On a contrary, in a cutting processing using turning tools or the like conducted in the prior art, physical stress inflicted on an object to be processed, such as the magnetic cores, is very high. Such processing is therefore not suited for such micro machining.

Furthermore, during the electrical discharge machining, it is preferable to rotate the discharge electrode and bring the thus rotating discharge electrode to the object to be processed from the side face of the track edge. In this way, machining accuracy of the track width in the depth direction of the magnetic gap 1 is stabilized. Furthermore, by using a discharge electrode of very thin and long shape having extremely small diameter as the discharge electrode, the object to be processed can be processed even if it is in a bar shape, thereby realizing mass production of the magnetic head 100.

As described above, according to the present invention, the magnetic head 100 having no track misalignment and suited for the narrow-track technique for the realization of high density magnetic recording can be provided with the high yield and at low cost. The magnetic head 100 can also reduce a recording/reproduction fringe. Moreover, by using this magnetic head 100, a high density recording/reproduction apparatus suited for digital VCR can be provided.

Materials which can be used for the magnetic films 19 and 20 of the magnetic head 100 include a Sendust alloy film, a Co type amorphous film, a Co type superstructure nitriding alloy film, an Fe type superstructure nitride film, an Fe type nitride film, etc. The magnetic films 19 and 20 are provided by depositing a film made of these materials on the surface of the ferrite cores 17 and 18 by vacuum thin film forming technique such as evaporation, ion plating, or sputtering.

Even in a configuration of a magnetic head of the prior art, an antireaction film having a thickness corresponding to half the width of the magnetic gap is sometimes provided on a portion of the surface of each of the magnetic cores other than the portion of the notches in order to obtain an antireaction effect between the magnetic cores and the front glass blocks. However, this antireaction film of the prior art also serves as a gap member, and is provided during the formation of the magnetic gap prior to the formation of the notches. In recent narrow-gap magnetic heads having narrower magnetic gap width, it is difficult to make the thickness of the above-mentioned antireaction film larger than a half of the magnetic gap width, resulting in insufficient antireaction effect. Although this is not directly related to a problem of the expansion of a track edge, it does lead to a reduction in glass strength due to a mutual diffusion reaction between the front glass blocks and the magnetic films, possibly reducing the yield of production of magnetic heads.

However, according to the present invention, the antireaction film 50 is formed as a constituent element separate from the gap member 40 after the formation of the magnetic gap 1. As a result, both the material and the thickness can be chosen arbitrarily, allowing a high degree of freedom of formation. For example, since the antireaction film of the prior art must also serve as the gap member, a crack sometimes occurs due to stress and strain resulting from a difference in thermal expansion coefficients between the magnetic cores and the antireaction film. On the other hand, according to the present invention, such a problem can be avoided by appropriately selecting the material or the film thickness for the antireaction film 50.

Materials which can be used as the constituting material of the gap member 40 include $SiO_2$, $ZrO_2$, $Ta_2O_5$, glass, Cr, Cr oxide, and a composite thereof.

The antireaction film 50 can be provided only on the surface of the magnetic films 19 and 20 at the notches 13a and 14a. However, as described with reference to FIG. 2, by providing the antireaction film 50 also on the portion 40 of the magnetic films 19 and 20 other than the notches 13a and 14a, the reduction in the glass strength due to the above-described cause can simultaneously be inhibited. Materials which can be used as the constituting material of the antireaction film 50 include $SiO_2$, $ZrO_2$, $Ta_2O_5$, glass, Cr, Cr oxide, and a composite thereof.

Next, a production method of the magnetic head 100 will be described with reference to FIGS. 4 to 10.

Figure 4:
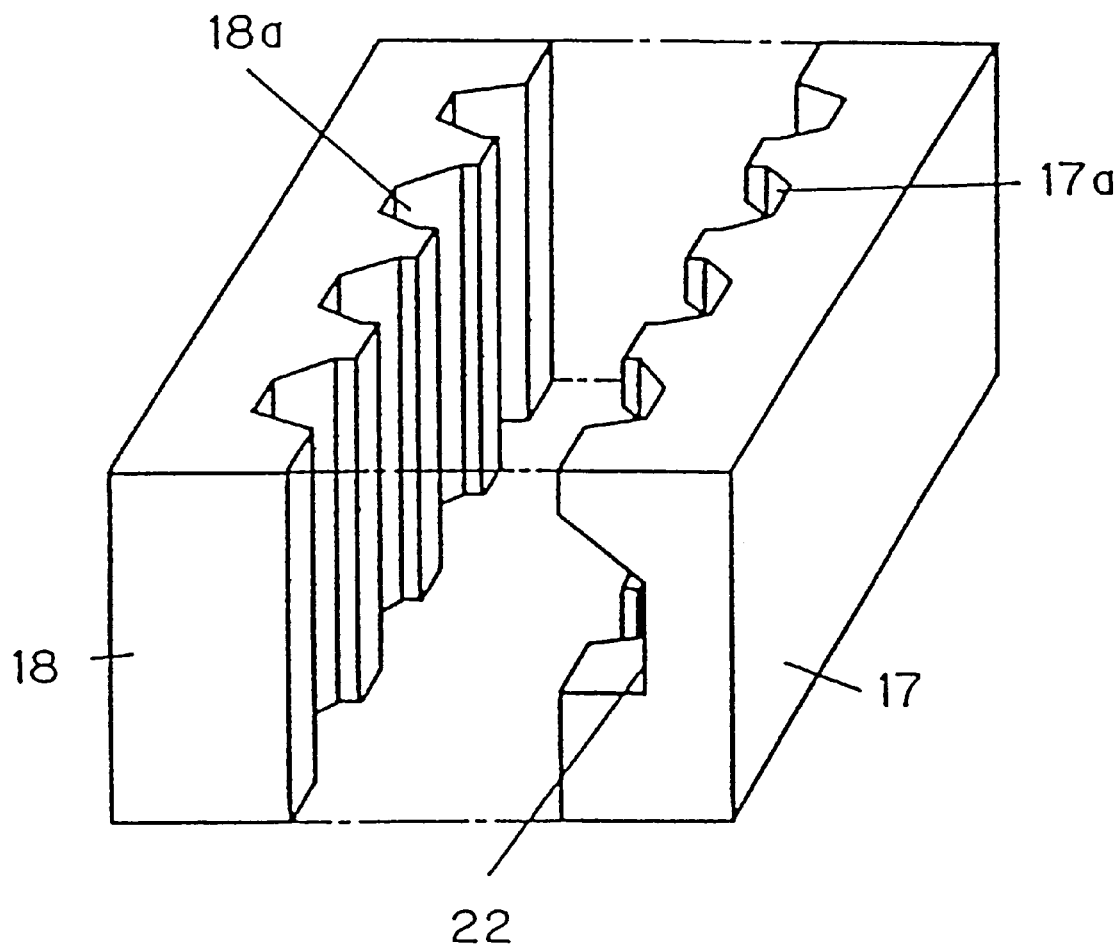
FIG. 4 is a perspective view describing a step in the production method of the magnetic head in the embodiment of the present invention.

First, a pair of substrates 17 and 18 made of, for example, Mn—Zn ferrite whose surface has been processed by lapping or the like to obtain excellent parallelism and smoothness is prepared. As shown in FIG. 4, a plurality of track grooves 17a and 18a are formed parallel to each other by a grinding wheel or the like to each of the substrates 17 and 18. This provides to the pair of the substrates 17 and 18 each having a configuration including a plurality of constituting elements, each of which is to constitute a pair of the ferrite cores 17 and 18 in the magnetic head 100 in a finished state. Hereinafter, such substrates provided with the shape corresponding to the ferrite cores 17 and 18 are referred to as the "ferrite core body", and designated by the same reference numerals, namely 17 and 18, as the ferrite cores.

At least, one of the ferrite core bodies 17 and 18 is provided with a winding groove 22 through which coils can pass. The track grooves 17a and 18a are to determine the shape of the convexly processed or bevelled portion 39 in the magnetic head 100 in the finished state, and the winding groove 22 corresponds to the winding window 21 in the magnetic head 100 in the finished state.

Figure 5:
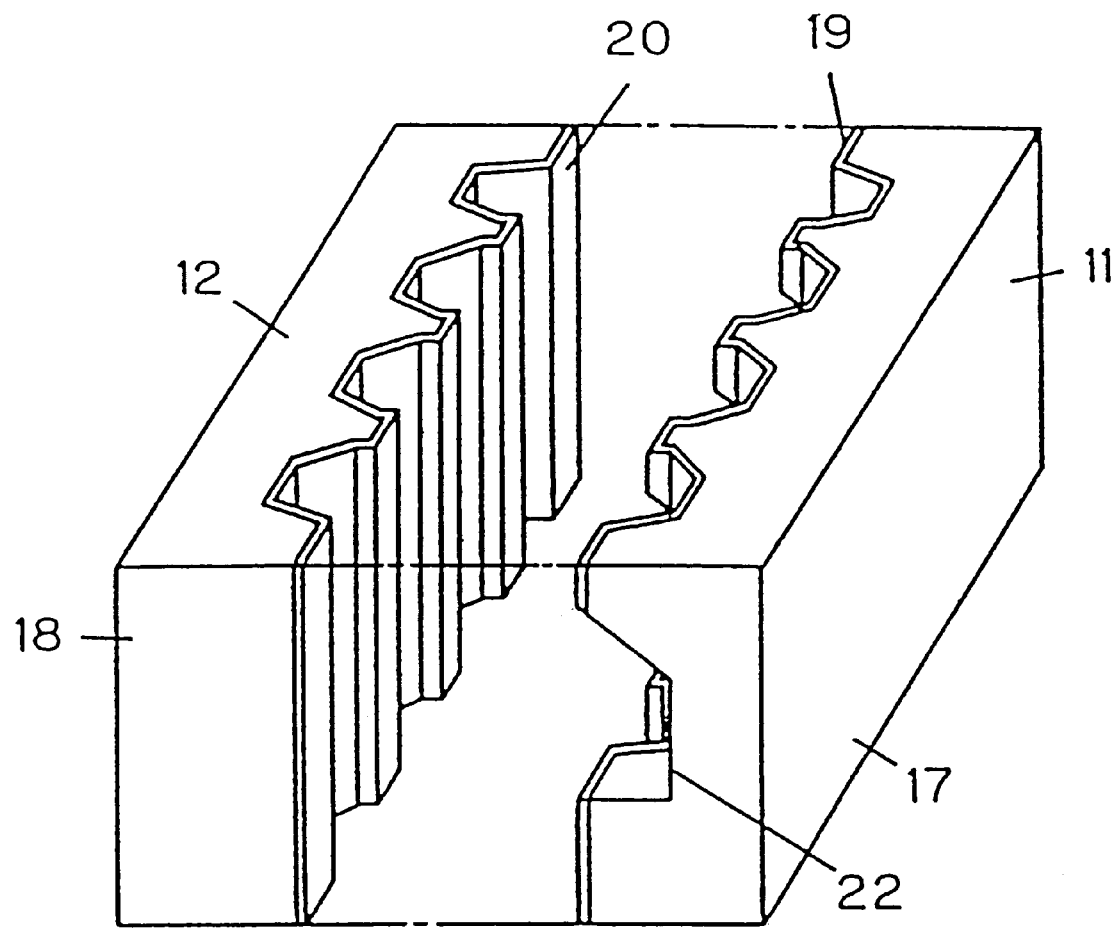
FIG. 5 is another perspective view describing a step in the production method of the magnetic head in the embodiment of the present invention.

Next, as shown in FIG. 5, the magnetic films 19 and 20 having high saturation magnetic flux densities are formed on the side faces of the ferrite core bodies 17 and 18 by depositing them by vacuum thin film forming technique. This completes a pair of the magnetic core bodies 11 and 12. The term "magnetic core bodies" used here refers to a shape where a plurality of constituting elements are formed, each of which corresponds to the magnetic cores 11 and 12 in the magnetic head 100 in the finished state, and they are designated by the same reference numerals, namely 11 and 12, as the magnetic cores.

Materials which can be used as the constituting materials for the magnetic films 19 and 20 include a Sendust alloy film, a Co type amorphous film, a Co type superstructure nitriding alloy film, an Fe type superstructure nitride film, an Fe type nitride film, etc. These are formed by vacuum thin film formation technique such as evaporation, ion plating, sputtering, etc.

Figure 6:
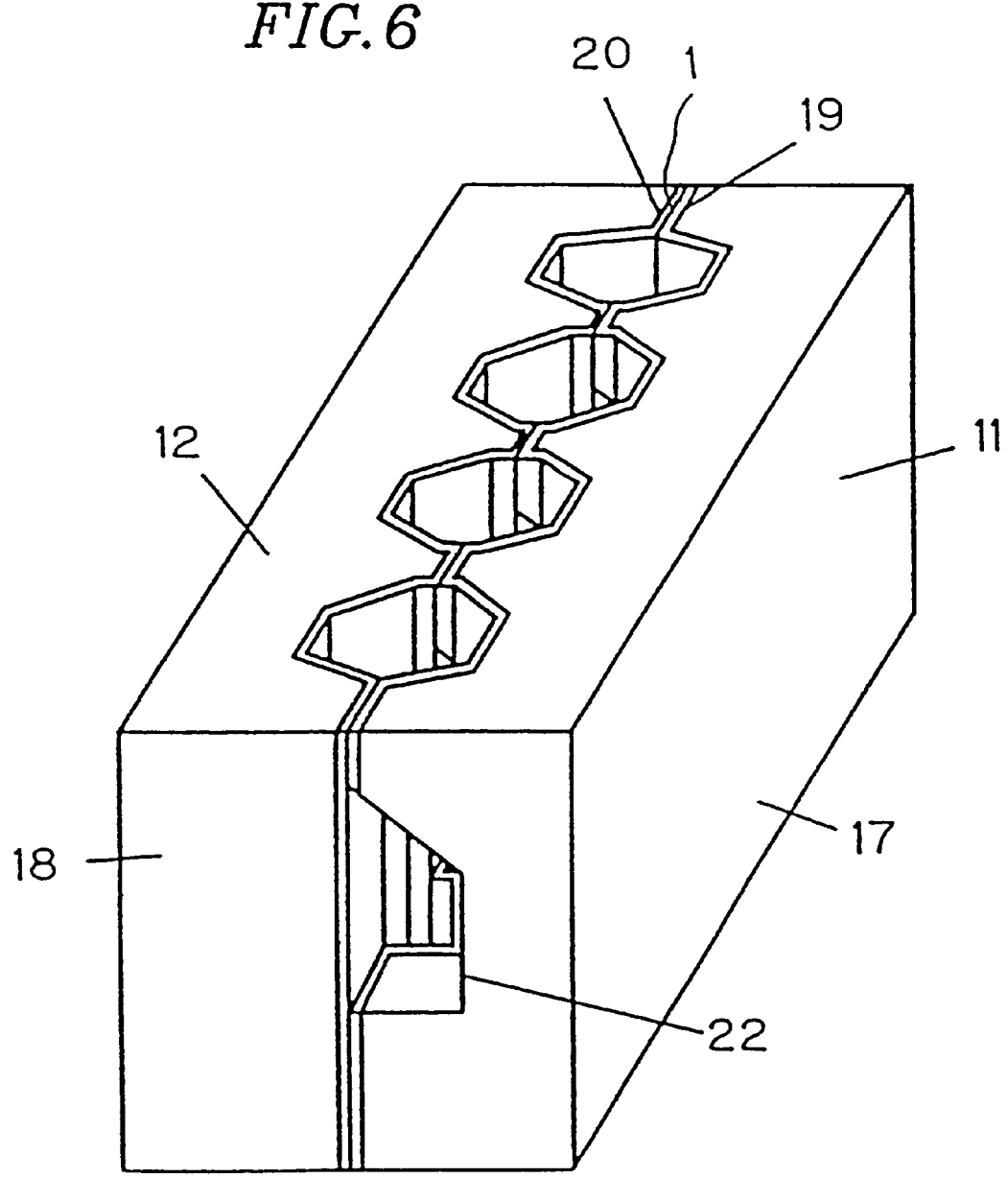
FIG. 6 is still another perspective view describing a step in the production method of the magnetic head in the embodiment of the present invention.

Next, a gap member of a film shape (not shown in FIGS. 4 through 10) for forming the magnetic gap is provided to either one or both of the pair of the magnetic core bodies 11 and 12. Then, with this gap member being sandwiched in between, the magnetic core bodies 11 and 12 are disposed opposite to each other as shown in FIG. 6. Materials which can be used as the constituting material for the gap member include $SiO_2$, $ZrO_2$, $Ta_2O_5$, glass, Cr, Cr oxide, and a composite thereof.

According to the present invention, since the antireaction film 50 is provided after the formation of the magnetic gap 1, it is not necessary to require the constituting material for the gap member to have a function of inhibiting diffusion reaction between the magnetic films 19 and 20 and the front glass blocks 15a and 16a. Therefore, a film of a constituting material best suited for the gap member such as a film made solely of $SiO_2$ or a metal film of Au or the like can be used. This reduces the number of forming steps for the magnetic gap as well as the production cost. Also, the magnetic gap can be formed in an excellent condition and, as a result, stable electromagnetic transformation characteristics can be obtained.

Figure 7:
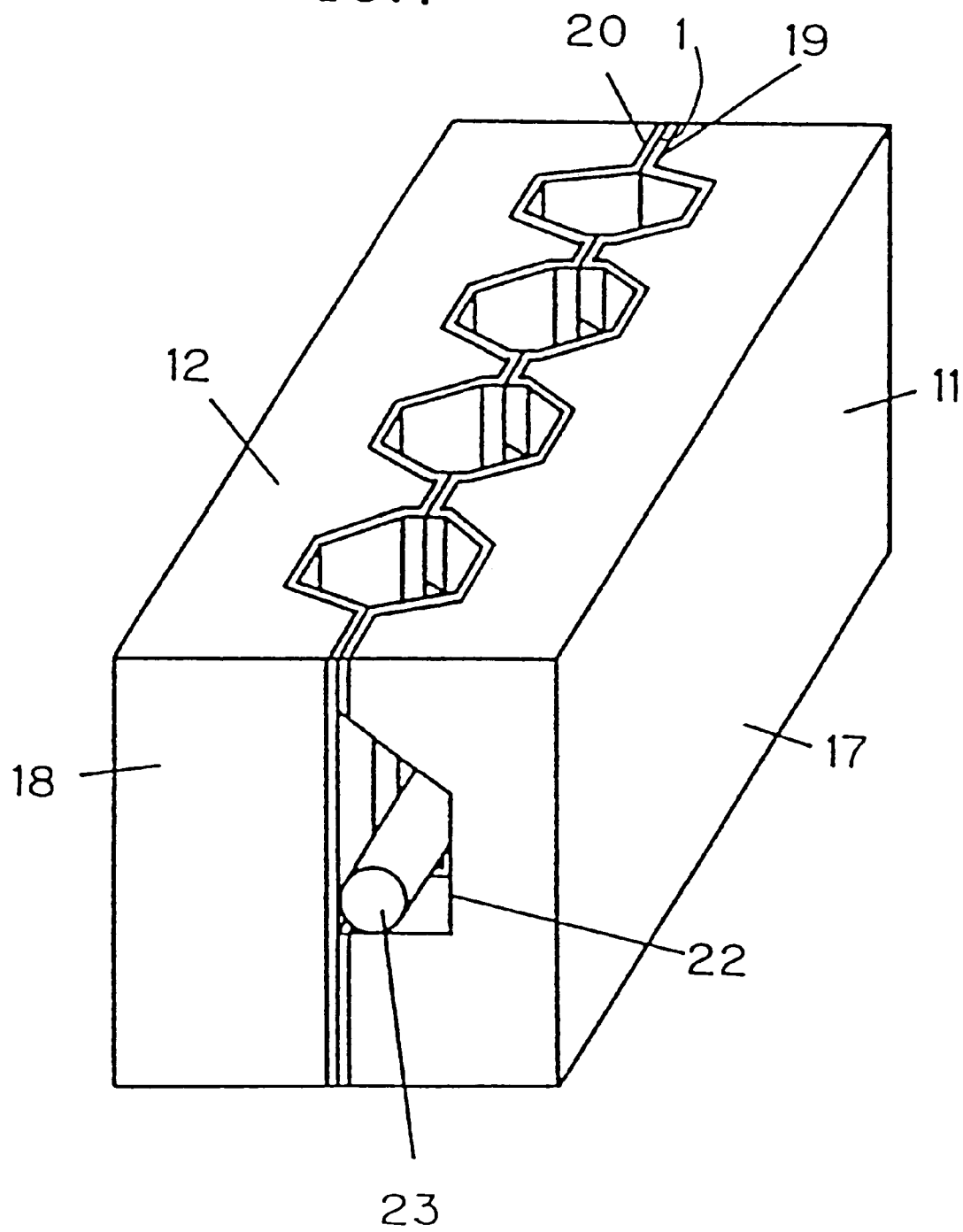
FIG. 7 is still another perspective view describing a step in the production method of the magnetic head in the embodiment of the present invention.

Next, as in FIG. 7, a back glass bar 23 is inserted in the winding groove 22, and heat treatment is conducted to weld together the magnetic core bodies 11 and 12. The back glass bar 23 which melts in this heat treatment is to constitute the back glass blocks 15b and 16b in the magnetic head 100 in the finished state.

Figure 8:
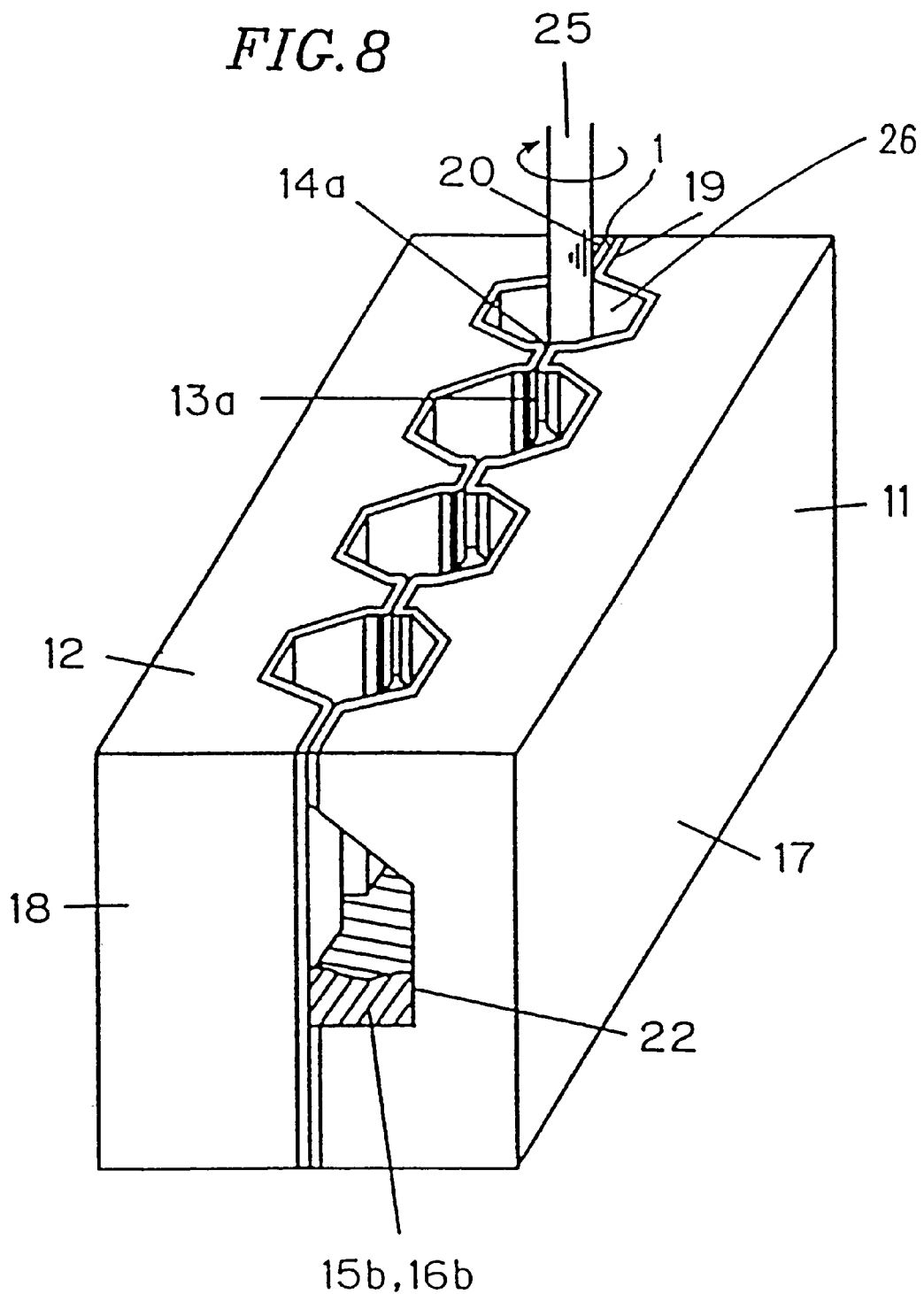
FIG. 8 is still another perspective view describing a step in the production method of the magnetic head in the embodiment of the present invention.

Next, electric discharge is initiated for the pair of the magnetic core bodies 11 and 12 which are in the state that the back butting portions thereof are welded together with the back glass blocks 15b and 16b by the above-mentioned heat treatment using the back glass bar 23 in such a way that the discharge electrode 25 is brought into the proximity of each of the track sides as shown in FIG. 8. The notches 13a and 14a are formed by this electric discharge. In this way, the notches 13a and 14a which reach the winding groove 22 are formed while keeping the track width Tw on the top face. The notches 13a and 14a are formed so as to flank the butting portion of the convexly processed portion 39 from both sides, ranging from the both magnetic core bodies 11 and 12.

During the electric discharge, a wear of the discharge electrode 25 associated with the process is made uniform by using the discharge electrode 25 of a cylindrical shape which is rotated during the electric discharge machining. This also prevents the discharge electrode 25 from being bent, and consequently, constant shapes for the notches 13a and 14a to be formed are obtained. Furthermore, the revolution of the discharge electrode 25 can reduce a surface roughness of the notches 13a and 14a to about 0.1 µm to about 0.2 µm in $R_{max}$. In addition, the notches 13a and 14a can be made of almost perfect circular shape.

Furthermore, it is preferable that a radius R of the circular notches 13a and 14a is smaller than the thickness t (refer to FIG. 2) of the magnetic films 19 and 20 at the gap 1. This prevents the notches 13a and 14a from reaching the ferrite cores 17 and 18. If the notches 13a and 14a reach the ferrite cores 17 and 18, then in a case where there arises a need to narrow the width of the tip portion of the convexly processed portion 39 of the ferrite cores 17 and 18 as a need for narrower tracks increases, there arises a possibility that magnetic characteristics deteriorate. On the other hand, if the notches 13a and 14a are formed by processing only the magnetic films 19 and 20, thereby preventing the notches 13a and 14a from reaching the ferrite cores 17 and 18, then the problems mentioned above can possibly be avoided.

It is preferable that the discharge electrode 25 to be used has a diameter of about 10 µm to about 30 µm. If the diameter is less than about 10 µm, sufficient strength as the discharge electrode 25 cannot be maintained and breakage is likely to occur during machining. On the other hand, if the discharge electrode 25 having a diameter exceeding about 30 µm is to be used, the thickness of the magnetic films 19 and 20 as the object to be processed must be sufficiently large. However, such magnetic films 19 and 20 having large thickness cause deterioration of electromagnetic transformation characteristics due to the occurrence of eddy current loss inside the magnetic film 19 and 20 or due to the reduction of a squeezing effect relating to the shape of the magnetic head 100. Therefore, it is desirable that the diameter of the discharge electrode 25 is within the above-mentioned range.

More preferably, a diameter of the discharge electrode 25 of about 16 µm to about 18 µm is appropriate. This also determines the thickness of the magnetic films 19 and 20 at the magnetic gap 1. The preferable thickness of the magnetic films 19 and 20 is about 8 µm to about 10 µm.

For a mass production of the magnetic head 100, the notches 13a and 14a are formed by processing the material in a bar state as shown in FIG. 8. Specifically, there are several tens of tracks in a single bar. In such a case, in order to form the notches 13a and 14a at each track edge, it is necessary to insert the discharge electrode 25 in each of narrow holes 26 and process the inside surface thereof. These narrow holes 26 typically each has a diameter of about 100 µm, so that a processing thereof by a cutting tool is practically impossible. However, the discharge electrode 25 having a diameter in the above-mentioned range is fully capable of machining the inside surface of the narrow holes 26, and is suitable for mass production of the magnetic head 100.

Moreover, it is possible to control the machining position on a submicron level by the discharge electrode 25. That is, in the electric discharge machining, when the discharge electrode 25 is brought into the proximity of the object to be processed, it is possible to use the discharge electrode 25 itself as a sensor to recognize a position where the electric discharge should be initiated. Since, by doing so, a current position of the discharge electrode 25 can continuously be followed without conducting position alignment under a microscope or the like, the electric discharge machining is suitable for mass production.

Moreover, since the electric discharge machining is capable of recognizing a machining position on a submicron level, it is fully possible to process the arc shape of the notches 13a and 14a in such a way that the tangent to the arc shape at the intersection point P with the magnetic gap 1 becomes substantially parallel with the direction of travel of the magnetic tape, as illustrated in detail with reference to FIG. 3. Furthermore, a track width of a predetermined value can be formed with high accuracy.

The electric discharge machining is typically conducted while the object to be processed is immersed in an insulating oil. It is also possible to conduct the machining in pure water. Machining in pure water does not require washing of the insulating oil in later steps, thereby simplifying production.

According to the present invention, the magnetic core bodies 11 and 12 are fixed with the back glass blocks 15b and 16b during the formation of the notches 13a and 14a. Because of this, a misalignment of the track edge does not result even on a micron level.

Figure 9:
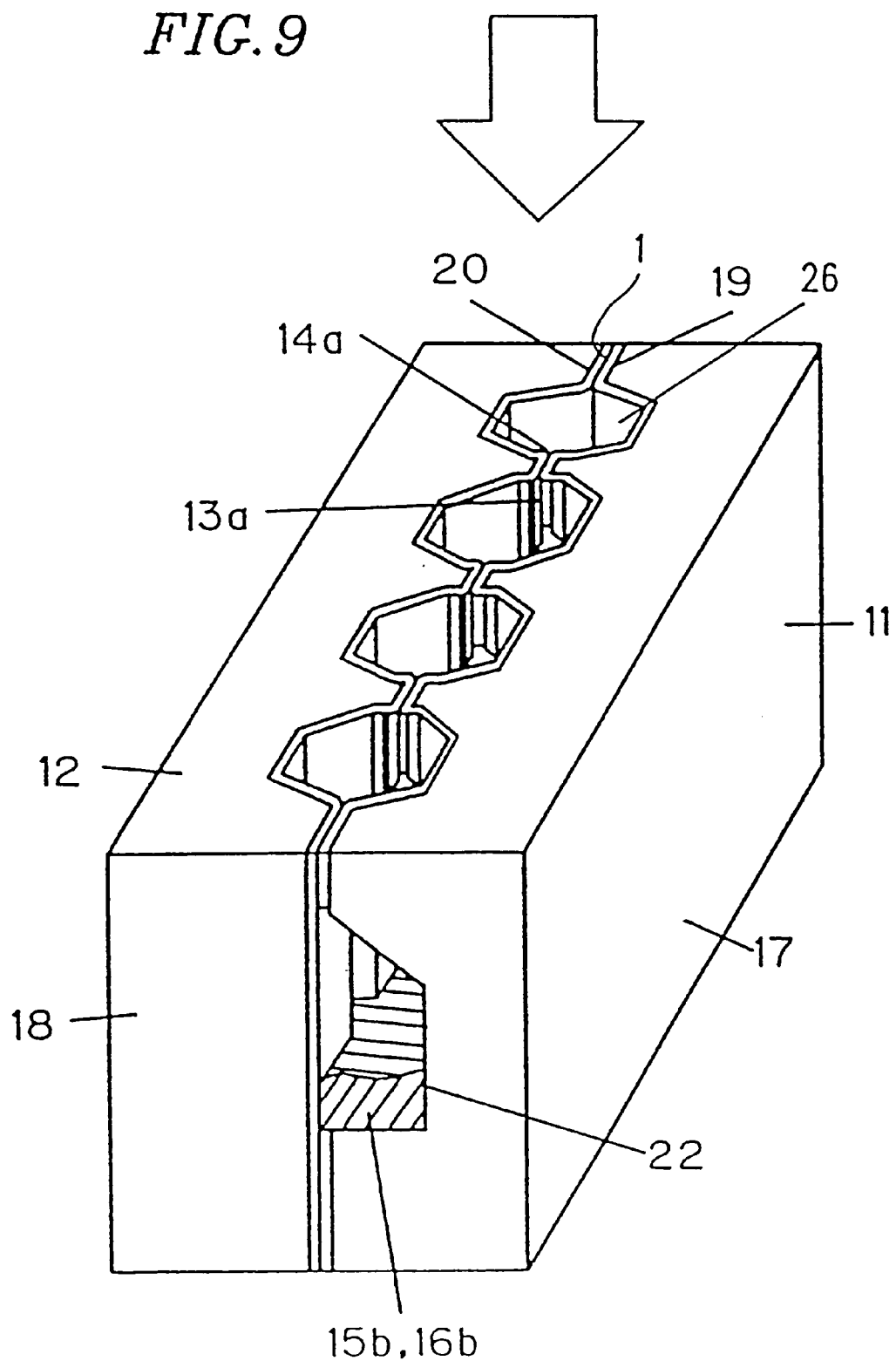
FIG. 9 is still another perspective view describing a step in the production method of the magnetic head in the embodiment of the present invention.

Next, the antireaction film (not shown in FIG. 9) is formed on the surface of the notches 13a and 14a which are illustrated in FIG. 9 and formed as described above. Materials which can be used as a forming material for the antireaction film include $SiO_2$, $ZrO_2$, $Ta_2O_5$, glass, Cr, Cr oxide, and a composite thereof. Sputtering is typically used for forming the film.

In the sputtering process, the film deposition is performed only from the top face of the front portion indicated as "direction A" in FIG. 9. However, a film can be formed with appropriate film quality and film thickness on the surface of the notches 13a and 14a by tilting the pair of the magnetic core bodies 11 and 12 welded together at an appropriate angle with respect to the sputtering target.

Alternatively, instead of the sputtering, plasma CVD as an example of dry type production method, or dipping or plating as an example of wet type production method can be used to form the film in a good condition.

In FIG. 9, the back glass blocks 15b and 16b exist at the lower portion of the narrow holes 26 which are formed between the magnetic core bodies 11 and 12. Next, at least a part of the remaining space above the back glass blocks 15b and 16b is filled with the front glass blocks 15a and 16a by heat treatment. When this is being done, there is provided the antireaction film 50 at the interfaces between the notches 13a and 14a and the filling front glass blocks 15a and 16a, respectively, as described in detail with reference to FIG. 2. Therefore, the magnetic films 19 and 20 and the front glass blocks 15a and 16a do not react, and the expansion of the track edge does not occur, either. As a result, the magnetic head having a track edge which is also magnetically sharp can be provided.

Furthermore, it is preferable to set the softening point of the front glass blocks 15a and 16a lower than that of the back glass blocks 15b and 16b. In this case, by setting the processing temperature of the heat treatment, which allows the front glass blocks 15a and 16a to be filled, melted and fixed, at an intermediate temperature between the softening point of the front glass blocks 15a and 16a and that of the back glass blocks 15b and 16b, the front glass blocks 15a and 16a can be melted and fixed without softening the back glass blocks 15b and 16b. This makes it possible to form the magnetic head 100 with better processing accuracy without even creating track misalignment on a micron level after the completion of the electric discharge machining.

Furthermore, in the step shown in FIG. 6, when the pair of the magnetic core bodies 11 and 12 are welded together at the magnetic gap 1 with an appropriate welding material, such as low melting point glass or crystallized glass, more stabilized track width can be realized. In this case, the damage of the gap 1 can also be prevented and electromagnetic transformation characteristics can be stabilized.

Furthermore, by forming the notches 13a and 14a by electric discharge machining, the surface roughness of the processed surface is reduced. This improves the flow of the front glass blocks 15a and 16a when filling them by the heat treatment, and consequently the amount of bubbles which are formed in the front glass blocks 15a and 16a and lead to defects is reduced.

Figure 10:
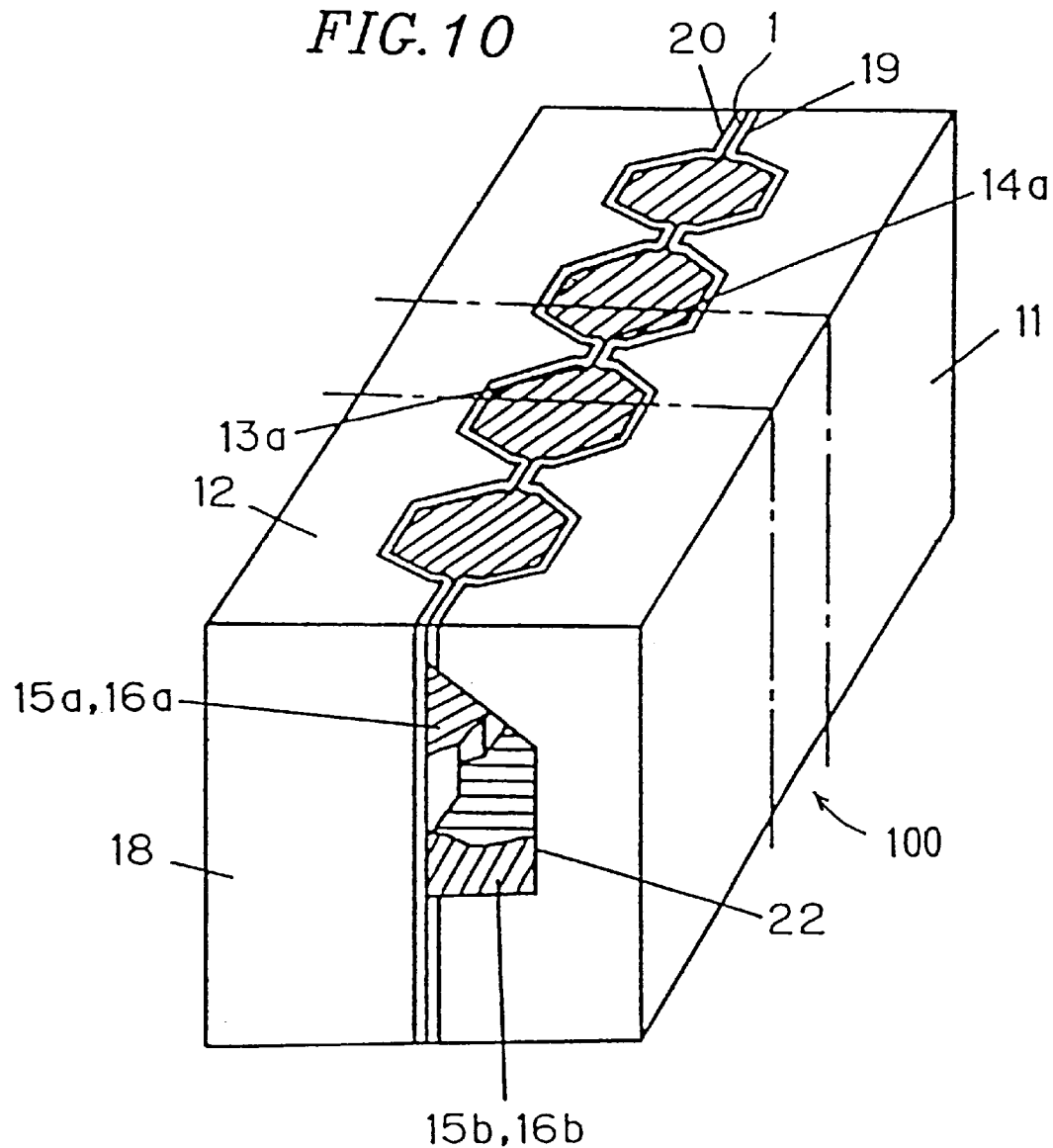
FIG. 10 is still another perspective view describing a step in the production method of the magnetic head in the embodiment of the present invention.

Thereafter, as shown in FIG. 10, the magnetic core bodies 11 and 12 are sliced into individual chips along a dash-dot line in the figure. Furthermore, coils are wound on each of the separated chips, and the magnetic head 100 of the present invention is completed.

As described above, the present invention is particularly effective when applied to a narrow-gap and narrow-track MIG head. However, it can also be applied to an MIG head which has a magnetic film on only one of the cores, or to a magnetic head having relatively wide track width. In either case, an increase in the yield of production due to the improvement of the accuracy of the track width is realized.

Figure 11:
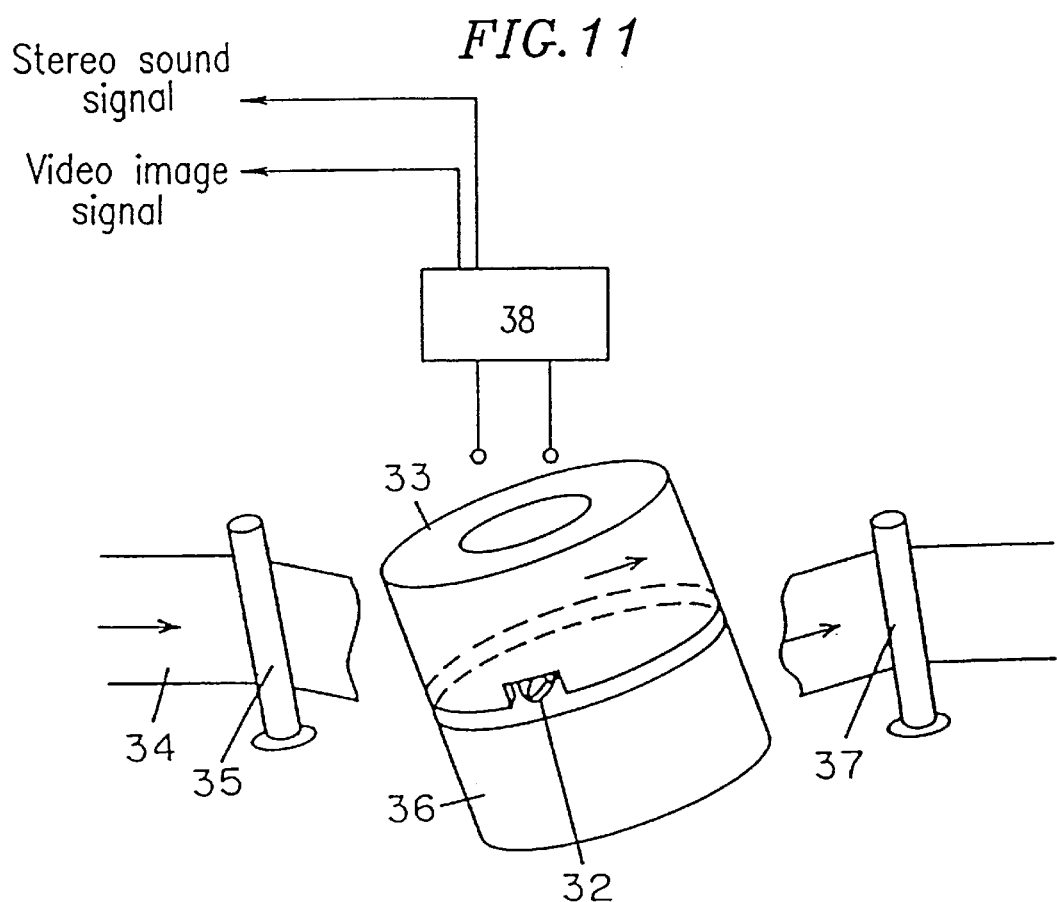
FIG. 11 is a perspective view illustrating a configuration in the vicinity of a magnetic head of a magnetic recording/reproduction apparatus in an embodiment of the present invention.

FIG. 11 is a view schematically illustrating a configuration in the vicinity of a magnetic head in a certain embodiment of a magnetic recording/reproduction apparatus according to the present invention.

A magnetic head 32 is mounted on a rotary cylinder 33 which is installed on a fixed cylinder 36 and performs helical scanning. A magnetic tape 34 which is guided by tilted posts 35 and 37 travels while keeping contact with the magnetic head 32. During the running of the magnetic tape 34, signals are recorded on the magnetic tape 34 or signals which are recorded on the magnetic tape 34 are reproduced. The reproduced signals are processed in a signal processing circuit 38 and become stereo sound signals or video image signals.

Figure 12:
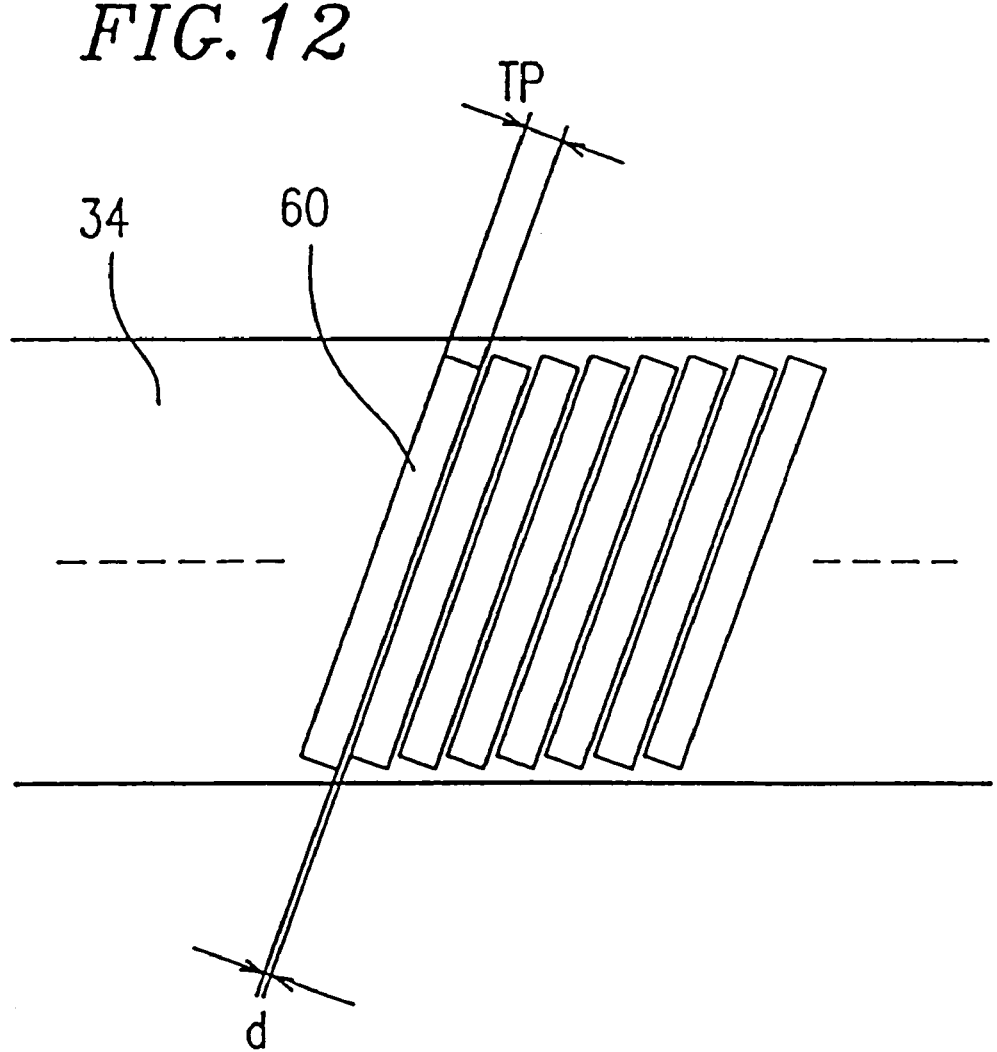
FIG. 12 is a view schematically illustrating a recording pattern on a recording medium recorded by the magnetic recording/reproduction apparatus of the present invention shown in FIG. 11.
Figure 13:
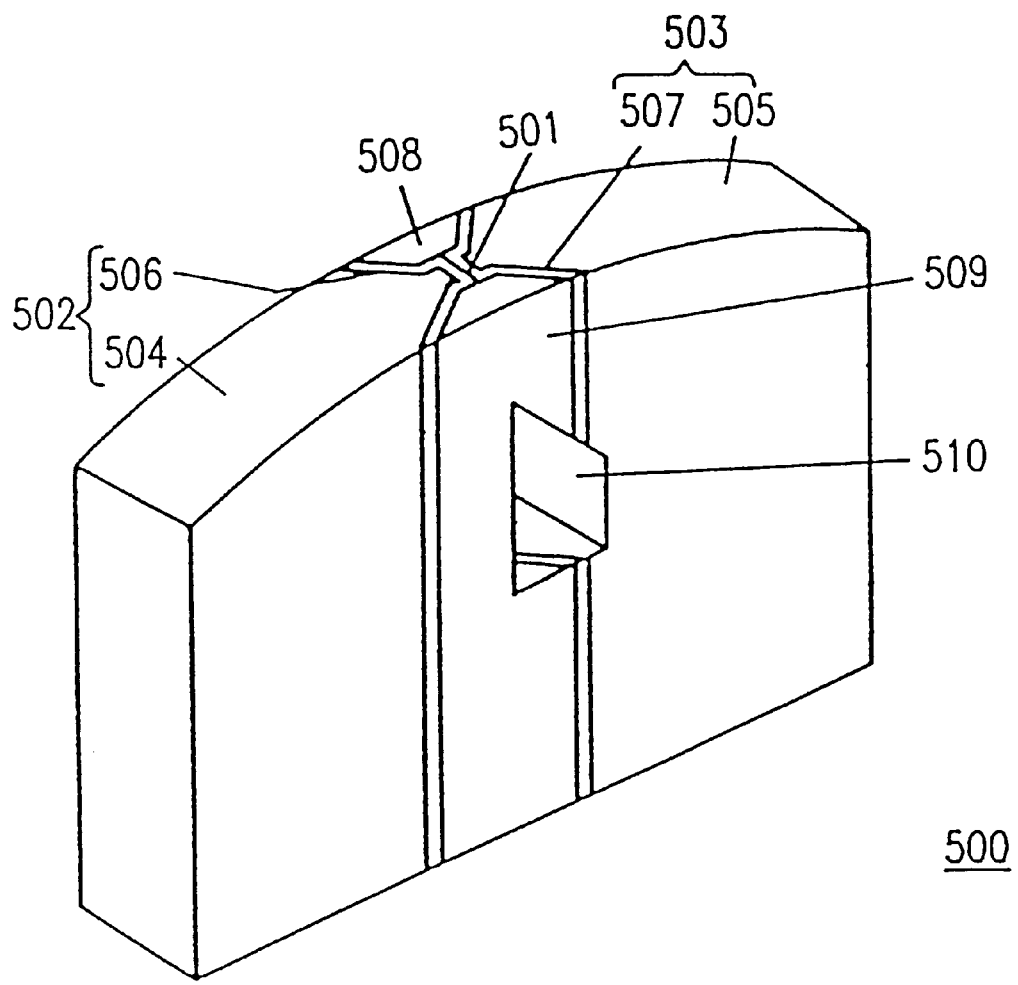
FIG. 13 is a perspective view schematically illustrating a configuration of a magnetic head according to the prior art.
Figure 14:
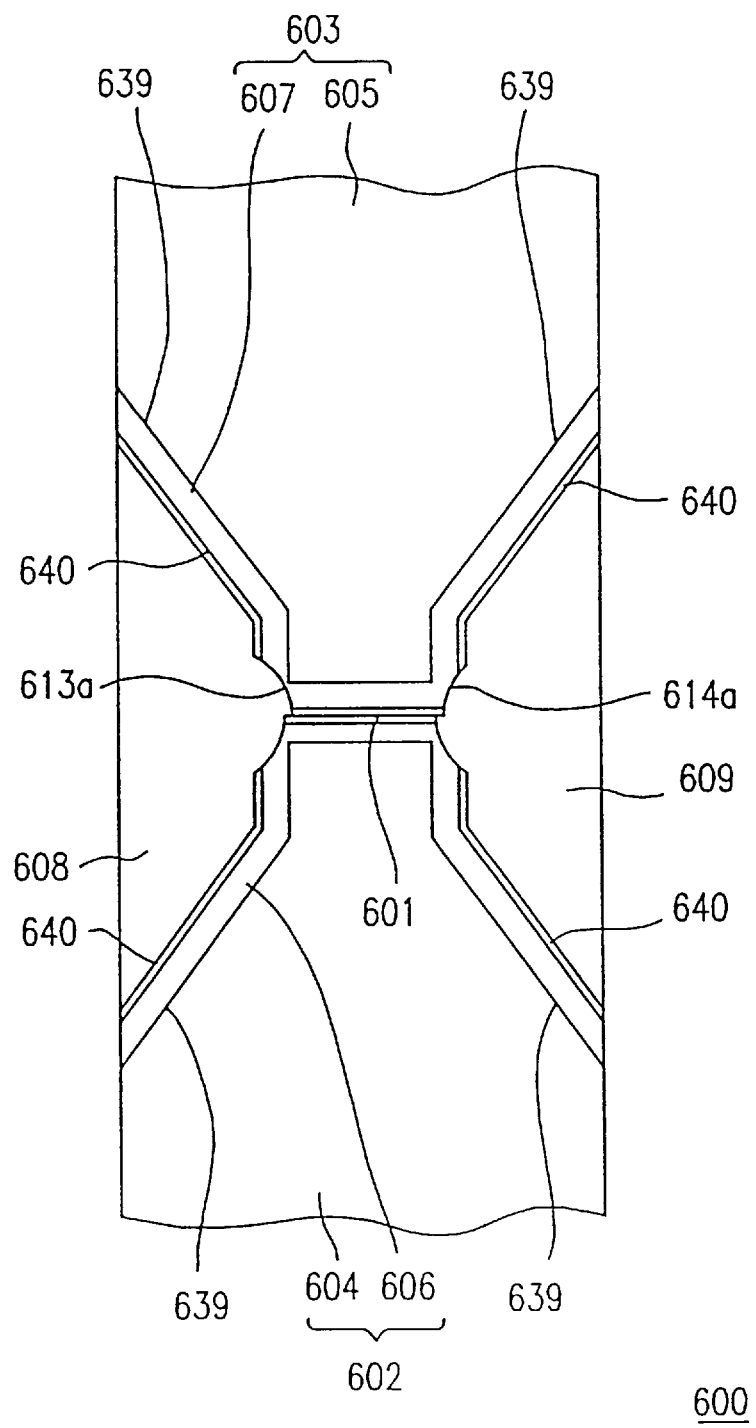
FIG. 14 is a plan view schematically illustrating a configuration of a magnetic tape sliding face of another magnetic head according to the prior art.

FIG. 12 is a view schematically illustrating a recording pattern 60 of the signals on the magnetic tape 34. The signals are recorded diagonally on the magnetic tape 34 in accordance with the recording pattern 60 which makes a certain angle with the longitudinal direction of the magnetic tape 34. A reference symbol "TP" in FIG. 12 corresponds to the track width on the magnetic tape 34.

When the narrow-track magnetic head with no butting misalignment, as provided by the present invention, is used, a blur of the magnetic flux at the track edge resulting from fringes or the like on the recording side does not occur. Consequently, a data-missing portion between the tracks (a portion where signals are not recorded and indicated by "d" in FIG. 12) hardly occurs. As a result, the track width TP does not become narrow and very large amount of information is recorded on the magnetic tape 34. Moreover, since the track edge of the magnetic head 32 can be uniquely determined when installing the magnetic head 32 to the rotary cylinder 33, the height adjustment of the track can be conducted with accuracy.

As described above, according to the production method of the magnetic head of the present invention, a pair of magnetic cores which have been processed in advance into a convex shape are butted together, and their back portions are welded together with back glass blocks. In this state, a pair of magnetic film portions positioned in the vicinity of the magnetic gap is processed to obtain a pair of notches regulating a track width. In this way, a magnetic head is provided, which does not have a track misalignment even on a micron level.

Furthermore, forming the notches using the electric discharge machining process enables surface roughness of the processed surface to be reduced, as well as prevents a process-induced denatured layer from being produced at the processed surface. This prevents occurrence of problems such as damage of an edge at the magnetic gap, deterioration of magnetic characteristics, deterioration of accuracy of an effective track width, etc; thereby providing a narrow-track magnetic head having excellent operational characteristics. Moreover, since the electric discharge machining does not inflict large physical stresses to on object to be processed during machining, cracks or the like are prevented from occurring.

Furthermore, the machining in which the rotating discharge electrode is brought against the object to be processed from the side face of the track edge stabilizes a machining accuracy of the track width in the depth direction of the magnetic gap. Moreover, if a very thin discharge electrode is used, an object in a bar shape can be processed and mass production can easily be realized.

As described above, according to the present invention, a magnetic head which does not have a track misalignment and is suited for the narrow-track technique for the realization of high density magnetic recording is provided with a good yield at low cost. With the magnetic head provided, a recording/reproduction fringe is reduced. Furthermore, by using such a magnetic head, a high density recording/reproduction apparatus suited for digital VCR is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic head, comprising:
   a pair of magnetic cores each having a convexly processed part, said convexly processed parts being disposed opposite to each other with a magnetic gap member inserted therebetween to form concave regions on opposite sides of said magnetic gap member, each of said concave regions having a generally continuous concave surface; and a pair of glass blocks disposed in said concave regions on both sides of said pair of magnetic cores, thereby coupling together said pair of magnetic cores, wherein a magnetic film is formed at least on a projection end face of said convexly processed part of each of said pair of magnetic cores; and a pair of notches regulating a track width on a magnetic tape sliding face of said pair of magnetic cores are each formed by electric discharge machining at a respective one of the concave surfaces so as to flank a butted part of said convexly processed parts of said pair of magnetic cores from both sides, said pair of notches being circular in shape and forming magnetic gap defining further concave regions extending inwardly beyond the respective concave surfaces towards one another such that an interface thereof is not positioned out of an edge of a recording pattern on a magnetic tape when said magnetic tape travels; and further wherein a respective tangent to an arc of each of said notches at an intersection point of a magnetic gap and said arc is substantially parallel with a direction of travel of said magnetic tape, and said magnetic tape travels at an inclined angle relative to a direction normal to a direction of said magnetic gap between said intersection points, and an antireaction film is provided at least between said pair of notches and said pair of glass blocks across respective sides of a magnetic gap existing between said pair of notches with said magnetic gap member inserted therein, said antireaction film remaining along the further concave regions.

2. A magnetic head according to claim 1, wherein the antireaction film is provided at the end faces of the magnetic gap member inserted between the convexly processed parts of the magnetic cores.

3. A magnetic recording/reproduction apparatus, comprising a magnetic head according to claim 1.

4. A magnetic head according to claim 1, further comprising a winding window for winding a coil, said pair of notches reaching said winding window.

5. A magnetic head according to claim 1, wherein an interface between said magnetic film and each of said magnetic cores is substantially parallel with a face of said magnetic gap member at said projection end face.

6. A magnetic head according to claim 1, wherein each of said glass blocks comprises a front glass sub-block positioned close to said magnetic tape sliding face of the magnetic head and a back glass sub-block positioned away from said magnetic tape sliding face, a softening point of said front glass sub-block being set lower than a softening point of said back glass sub-block.

7. A magnetic head, comprising:

a pair of magnetic cores each having a convexly processed part, said convexly processed parts being disposed opposite to each other with a magnetic gap member inserted therebetween to form concave regions on opposite sides of said magnetic gap member, each of said concave regions having a generally continuous concave surface; and a pair of glass blocks disposed in said concave regions on both sides of said pair of magnetic cores, thereby coupling together said pair of magnetic cores, wherein a magnetic film is included at least on a projection end face of said convexly processed part of at least one of said pair of magnetic cores;

a pair of notches regulating a track width on a magnetic tape sliding face of said pair of magnetic cores are each formed at a respective one of the concave surfaces so as to flank a butted part of said convexly processed parts of said pair of magnetic cores from both sides, said pair of notches being circular in shape and forming magnetic gap defining further concave regions extending inwardly beyond the respective concave surfaces towards one another; and an antireaction film is provided at least between said pair of notches and said pair of glass blocks across respective sides of a magnetic gap existing between said pair of notches with said magnetic gap member inserted therein, said antireaction film remaining along the further concave regions.

8. A magnetic head according to claim 7, wherein the antireaction film is provided at the end faces of the magnetic gap member inserted between the convexly processed parts of the magnetic cores.

9. A magnetic recording/reproduction apparatus, comprising a magnetic head according to claim 7.

10. A magnetic head according to claim 7, wherein said notches are formed by electric discharge machining.

11. A magnetic head according to claim 7, further comprising a winding window for winding a coil, said pair of notches reaching said winding window.

12. A magnetic head according to claim 7, wherein each of said pair of magnetic cores comprises a ferrite core, said magnetic film being provided on a surface of each of said ferrite cores, and said pair of notches being formed only in said magnetic film and said magnetic gap member without reaching said ferrite cores.

13. A magnetic head, comprising:

a pair of magnetic cores each having a convexly processed part, said convexly processed parts being disposed opposite to each other with a magnetic gap member inserted therebetween to form concave regions on opposite sides of said magnetic gap member, each of said concave regions having a generally continuous concave surface; and a pair of glass blocks disposed in said concave regions on both sides of said magnetic cores, thereby coupling together said magnetic cores, wherein a magnetic film is included at least on a projection end face of said convexly processed part of at least one of said pair of magnetic cores;

a pair of notches regulating a track width on a magnetic tape sliding face of said pair of magnetic cores are each formed at a respective one of the concave surfaces so as to flank a butted part of said convexly processed parts of said pair of magnetic cores from both sides, said pair of notches being circular in shape and forming magnetic gap defining further concave regions extending inwardly beyond the respective concave surfaces towards one another; and each of said pair of glass blocks comprises a front glass sub-block positioned close to said magnetic tape sliding face of the magnetic head and a back glass sub-block positioned away from said magnetic tape sliding face, said front glass sub-block being interposed between said magnetic tape sliding face and said back glass sub-block, a softening point of said front glass sub-block being set lower than a softening point of said back glass sub-block, wherein the front glass sub-block and the back glass sub-block of each glass block are physically separated from one another so as to avoid physical contact therebetween, and an antireaction film is provided at least between said pair of notches and said pair of glass blocks across respective sides of a magnetic gap existing between said pair of notches with said magnetic gap member inserted therein, said antireaction film remaining along the further concave regions.

14. A magnetic head according to claim 13, wherein said notches are formed by electric discharge machining.

15. A magnetic head according to claim 13, wherein each of said pair of magnetic cores comprises a ferrite core, said magnetic film being provided on a surface of each of said ferrite cores, and said pair of notches being formed only in said magnetic film and said magnetic gap member without reaching said ferrite cores.

16. A magnetic head according to claim 13, further comprising a winding window for winding a coil, said pair of notches reaching said winding window.

17. A magnetic recording/reproduction apparatus, comprising a magnetic head according to claim 13.

18. A magnetic recording/reproduction apparatus, comprising a magnetic head, said magnetic head comprising a pair of magnetic cores each respectively comprising a convexly processed part and a magnetic film provided at least on a projection end face of said convexly processed part; and a glass block comprising a front glass sub-block positioned close to a front face of each respective magnetic core and a back glass sub-block positioned away from said front face of each respective magnetic core, said front glass sub-block being interposed between a magnetic tape sliding face and said back glass sub-block, said magnetic head being produced in accordance with the following process steps:

disposing said projection end faces opposite to each other with a magnetic gap member inserted therebetween to form concave regions on opposite sides of said magnetic gap member, each of said concave regions having a generally continuous concave surface;

welding together said pair of magnetic cores with said back glass sub-block;

providing, by electric discharge machining, a pair of notches regulating a track width on said magnetic tape sliding face of said pair of magnetic cores each at a respective one of the concave surfaces so as to flank a butted portion of said convexly processed parts of said pair of magnetic cores from both sides, said pair of notches being circular in shape and forming magnetic gap defining further concave regions extending inwardly beyond the respective concave surfaces towards one another; and filling with a glass material a groove provided beforehand at a predetermined position of said pair of magnetic cores by heat treatment so as to form said front glass sub-block, wherein a softening point of the front glass sub-block is set lower than a softening point of the back glass sub-block, and the front glass sub-block and the back glass sub-block are physically separated from one another so as to avoid physical contact therebetween, and providing an antireaction film at least between said pair of notches and said pair of glass blocks across respective sides of a magnetic gap existing between said pair of notches with said magnetic gap member inserted therein, said antireaction film remaining along the further concave regions.

19. A magnetic recording/reproduction apparatus comprising a magnetic head, said magnetic head comprising a pair of magnetic cores each respectively comprising a convexly processed part and a magnetic film provided at least on a projection end face of said convexly processed part; and a glass block comprising a front glass sub-block positioned close to a front face of each respective magnetic core and a back glass sub-block positioned away from said front face of each respective magnetic core, said magnetic head being produced in accordance with the following process steps:

disposing said projection end faces opposite to each other with a magnetic gap member inserted therebetween to form concave regions on opposite sides of said magnetic gap member, each of said concave regions having a generally continuous concave surface;

providing, by electric discharge machining, a pair of notches regulating a track width on a magnetic tape sliding face of said pair of magnetic cores each at a respective one of the concave surfaces so as to flank a butted portion of said convexly processed parts of said pair of magnetic cores from both sides, said pair of notches being circular in shape and forming magnetic gap defining further concave regions extending inwardly beyond the respective concave surfaces towards one another; and forming an antireaction film, for preventing chemical reaction between said magnetic film and said glass block, at least on a surface of said pair of notches across respective sides of a magnetic gap existing between said pair of notches with said magnetic gap member inserted therein, said antireaction film remaining along the further concave regions; and filling with a glass material a groove provided beforehand at a predetermined position of said pair of magnetic cores by heat treatment so as to form said front glass sub-block.

* * * * *